(12) United States Patent
Seo et al.

(10) Patent No.: US 12,145,279 B2
(45) Date of Patent: Nov. 19, 2024

(54) METHOD AND APPARATUS FOR CALIBRATING POSITION OF ROBOT USING 3D SCANNER

(71) Applicant: CMES INC., Daejeon (KR)

(72) Inventors: Myoung Jin Seo, Seoul (KR); Sung Ho Lee, Seoul (KR)

(73) Assignee: CMES INC., Daejeon (KR)

( * ) Notice: Subject to any disclaimer, the term of this patent is extended or adjusted under 35 U.S.C. 154(b) by 320 days.

(21) Appl. No.: 17/777,078

(22) PCT Filed: Nov. 16, 2020

(86) PCT No.: PCT/KR2020/016060
§ 371 (c)(1),
(2) Date: May 16, 2022

(87) PCT Pub. No.: WO2021/096320
PCT Pub. Date: May 20, 2021

(65) Prior Publication Data
US 2022/0402141 A1    Dec. 22, 2022

(30) Foreign Application Priority Data

Nov. 15, 2019 (KR) .................. 10-2019-0146682
Nov. 16, 2020 (KR) .................. 10-2020-0152542

(51) Int. Cl.
*B25J 9/16* (2006.01)
*B25J 19/02* (2006.01)

(52) U.S. Cl.
CPC ........... *B25J 9/1692* (2013.01); *B25J 9/1671* (2013.01); *B25J 9/1697* (2013.01); *B25J 19/023* (2013.01)

(58) Field of Classification Search
None
See application file for complete search history.

(56) References Cited

U.S. PATENT DOCUMENTS

2019/0308326 A1    10/2019  Liu et al.
2023/0028160 A1 *   1/2023  Yuelai .................. B25J 9/16

FOREIGN PATENT DOCUMENTS

DE    102013011980 A1 *   3/2014  ............ B25J 9/1692
DE    102018200155 A1 *   8/2018  ............ B25J 19/023

(Continued)

OTHER PUBLICATIONS

International Search Report (English and Korean) and Written Opinion of the ISA (Korean) issued in PCT/KR2020/016060, mailed Feb. 18, 2021; ISA/KR.

*Primary Examiner* — Khoi H Tran
*Assistant Examiner* — Bryant Tang
(74) *Attorney, Agent, or Firm* — Harness, Dickey & Pierce, P.L.C.

(57) ABSTRACT

A robot position calibration apparatus is disclosed including a scan position controller configured to control the position of the robot by individually setting parameter sets related to the position of the robot for causing a scanner mounted on an end of the robot to scan an object in multiple scan positions around the robot, and a data receiver configured to receive, from the scanner, multiple scan data items generated by the scanner scanning the object in each of the multiple scan positions, and a parameter calibrator configured to calculate calibration values for the parameter sets having been individually set, by using multiple position information items corresponding to the parameter sets and the multiple scan data items.

10 Claims, 6 Drawing Sheets

(56) References Cited

FOREIGN PATENT DOCUMENTS

| JP | H09-167234 A | 6/1997 | |
|---|---|---|---|
| JP | 3101674 B2 * | 10/2000 | |
| KR | 10-2019-0027584 A | 3/2019 | |
| KR | 101964332 B1 | 7/2019 | |
| WO | WO-2013023130 A1 * | 2/2013 | ............ B25J 9/1692 |

* cited by examiner

METHOD AND APPARATUS FOR CALIBRATING POSITION OF ROBOT USING 3D SCANNER

CROSS-REFERENCE TO RELATED APPLICATIONS

This application is a U.S. National Phase Application under 35 U.S.C. 371 of International Application No. PCT/KR2020/016060, filed on Nov. 16, 2020, which claims the benefit of Korean Patent Application No. 10-2019-0146682, filed on Nov. 15, 2019, and Korean Patent Application No. 10-2020-0152542, filed on Nov. 16, 2020. The entire disclosures of the above applications are incorporated herein by reference. In addition, this non-provisional application claims priority in countries, other than the U.S., with the same reason based on the Korean patent applications, the entire content of which is hereby incorporated by reference.

BACKGROUND OF THE INVENTION

Field of the Invention

The present disclosure in some embodiments relates to a method and an apparatus for calibrating the posture or position of a robot by using a 3D scanner.

Discussion of Related Art

The statements in this section merely provide background information related to the present disclosure and do not necessarily constitute prior art.

Industrial 6-axis robots have high repeatability, but typically, their position accuracy is relatively low. This tends to hold back the robots' successful movement to an accurate position in three-dimensional space during sophisticated robot work.

To overcome the drawback, it is necessary to accurately find out parameters specific to the robot, for example, link length and linkage, angle offset, etc., wherein the task of finding out the parameters unique to the robot is called robot mastering or calibration.

In general, when mastering the robot, the parameters of the robot can be obtained by obtaining the position information of the end of the robot by using a laser tracker on the outside of the robot, but the price of the laser tracker is prohibitively expensive for the operator to implement in the real-world job sites.

It is currently common to use vision perception technology utilizing a three-dimensional scanner for sophisticated robot movement. Accordingly, such a system is increasingly employed that has a subsystem installed with a three-dimensional vision sensor near a gripper mounted on the end of the robot to obtain three-dimensional information about an object or work environment and that derives the relationship between the object and the robot to carry out the robot operation.

However, in many job sites with increasingly diverse atypical applications that cannot be tackled by just programming the robot's motion, improving the robot's movement accuracy is a direct factor linked to the robot's precise work.

BRIEF SUMMARY OF THE INVENTION

Technical Problem

The present disclosure in some embodiments seeks to provide an economical robot position calibration for improving the movement accuracy of the robot by using a three-dimensional scanner.

SUMMARY

At least one aspect of the present disclosure provides an apparatus for calibrating a position of a robot, including a scan position controller, a data receiver, and a parameter calibrator. The scan position controller is configured to control the position of the robot by individually setting parameter sets related to the position of the robot for causing a scanner mounted on an end of the robot to scan an object in multiple scan positions around the robot. The data receiver is configured to receive, from the scanner, multiple scan data items generated by the scanner scanning the object in each of the multiple scan positions. The parameter calibrator is configured to calculate calibration values for the parameter sets having been individually set, by using multiple position information items corresponding to the parameter sets and the multiple scan data items.

Another aspect of the present disclosure provides a method of calibrating a position of a robot, including controlling the position of the robot by individually setting parameter sets related to the position of the robot for causing a scanner mounted on an end of the robot to scan an object in multiple scan positions around the robot, and receiving, from the scanner, multiple scan data items generated by the scanner scanning the object in each of the multiple scan positions, and calculating calibration values for the parameter sets having been individually set, by using multiple position information items corresponding to the parameter sets and the multiple scan data items.

Advantageous Effects

The present disclosure in at least one embodiment can provide an accurate operation of the robot in the robot working environment.

Additionally, the present disclosure can perform the mastering of the robot by using a three-dimensional scanner mounted on the end of the robot, thereby implementing the robot mastering device economically.

DETAILED DESCRIPTION

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Figure 1:
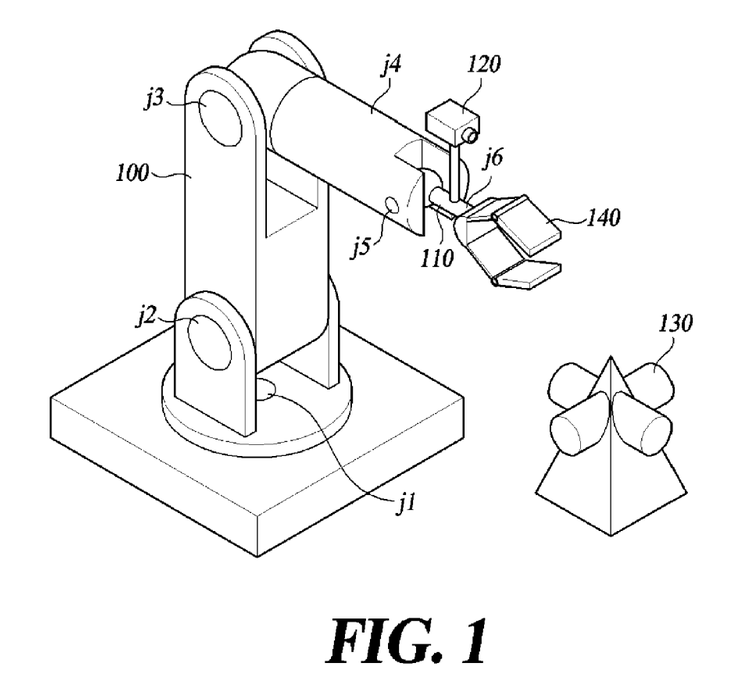
FIG. 1 shows an illustrative industrial 6-axis robot.

FIG. 1 shows an illustrative industrial 6-axis robot.

The robot 100 shown in FIG. 1 has 6 axes necessary for its operation, and each axis is driven by a driving motor to control the robot 100 to have the desired position.

The robot 100 is equipped at its end 110 with a scanner 120 for obtaining an image of the object 130 that is in the line of sight of the end 110.

In FIG. 1, six rotation axes j1, j2, j3, j4, j5, and j6 determine, by the rotational angles about thereof, the position of the robot 100 and the coordinate values of the end 110 of the robot 100, which are x, y, z, a roll angle (rx), a pitch angle (rx), and a yaw angle (rz).

This embodiment illustrates the robot 10 assumed to be a 6-axis robot, but the present disclosure is not limited to the 6 axes of the robot 100 and applies to robots having various numbers of axes.

Additionally, various devices for obtaining a three-dimensional (3D) image, such as a 3D scanner, may be included in the scanner 120.

Figure 2:
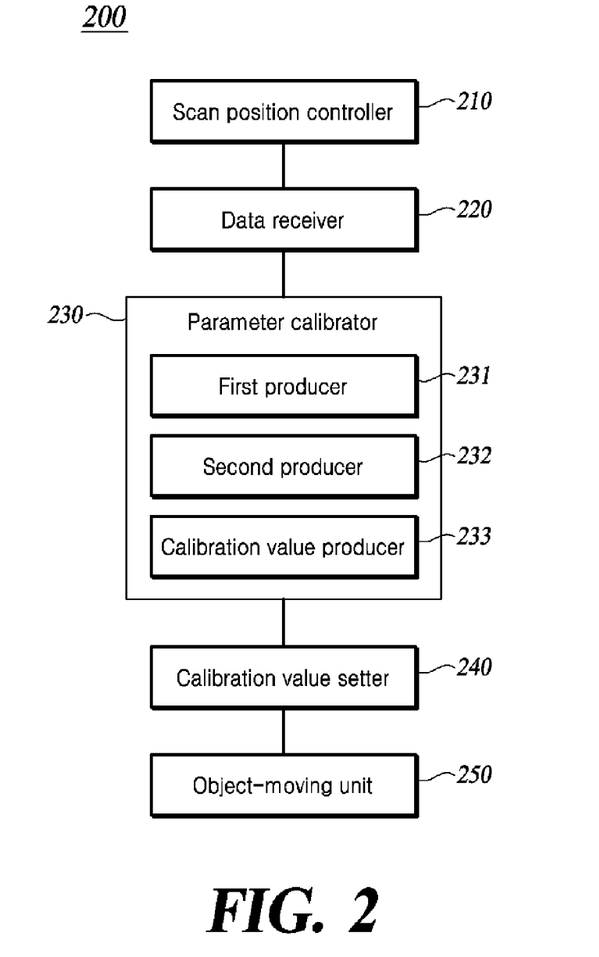
FIG. 2 is a block diagram of a robot position calibration apparatus according to at least one embodiment.

FIG. 2 is a block diagram of a robot position calibration apparatus according to at least one embodiment.

As shown in FIG. 2, the robot position calibration apparatus 200 according to this embodiment includes a scan position controller 210, a data receiver 220, a parameter calibrator 230, a calibration value setter 240, and an object-moving unit 250.

The scan position controller 210 sets a plurality of robot parameters related to the position of the robot 100 (hereinafter, parameters) for controlling the position of the robot 100 to allow the scanner 120 to take multiple scan positions around the robot 100 for scanning the object.

The values of a plurality of parameters for controlling the position of the robot 100 are defined as a parameter set. Since one position of the robot 100 is determined by one parameter set, three parameter sets correspond to three positions of the robot 100.

Even if the object 130 is captured by the scanner 120 multiple times, the images captured within similar capturing ranges and in similar robot positions leave almost no diverse directional error components in the robot positions across different parameter sets, which would undesirably limit the types of parameters for which errors are corrected within the parameter set.

Because of this, for the purpose of parameter set correction, utilizing scan data obtained by performing the image capturing in various capturing directions and various robot positions allows diverse directional error components to be introduced to more effectively set calibration values for the parameter sets.

Figure 3:
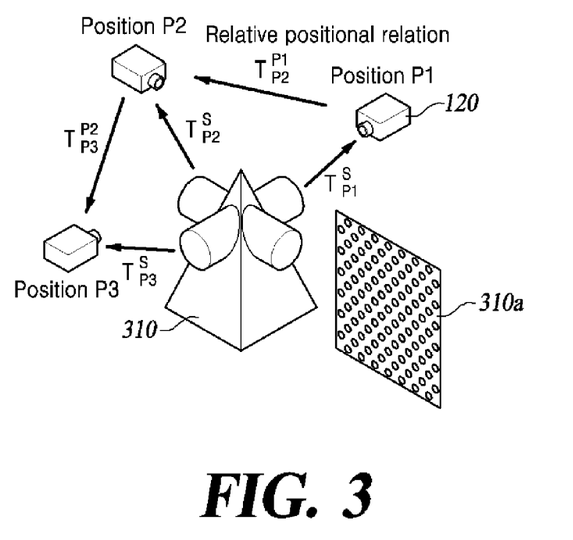
FIG. 3 is a view of the robot taking a plurality of positions to capture respective images of an object.

FIG. 3 is a view of the robot taking a plurality of positions to capture respective images of an object.

The scan position controller 210 controls the position of the robot 100 for causing the scanner 120 to capture the images of the object 310 in a plurality of scan positions, respectively. In FIG. 3, the number of scan positions is illustrated as three, but the present disclosure is not limited thereto and may have N (N is a natural number) scan positions such as 2, 4, and 5. The following description assumes that the number of scan positions is three unless otherwise specified.

For the scanner 120 to capture the images of the object 310 in three different directions toward the object 310, three parameter sets related to the position of the robot 100 for causing the scanner 120 to be directed toward the object 310 in three different positions of the scanner, respectively. For example, when one parameter set is determined, one scan position is determined to generate one scan data item, and when three parameter sets are determined, scan positions corresponding respectively to the three parameter sets are determined to generate three scan data items corresponding respectively to the three parameter sets.

The data receiver 220 receives, from the scanner 120, multiple scan data items generated by the scanner 120 scanning the object 310 in a plurality of scan positions, respectively.

The parameter calibrator 230 calculates parameter set calibration values by utilizing three robot position information (hereinafter, position information) items corresponding to three parameter sets that have been set respectively and utilizing three scan data items received from the scanner 120.

The parameter calibrator 230 includes a first producer 231, a second producer 232, and a calibration value producer 233.

The first producer 231 utilizes multiple scan data items for calculating positional relations between a plurality of scan positions for each of the combined scan position pairs (hereinafter, referred to as a first positional relation).

As shown in FIG. 3, the first producer 231 obtains, from multiple scan data items, a position transformation matrix of each coordinate system of the scanner 120 with respect to the coordinate system of the object 310, as a first positional relation. For example, obtained are a position transformation matrix $T^s_{P1}$ of the scanner coordinate system in a scan position P1 with respect to the coordinate system of the object 310, a position transformation matrix $T^s_{P2}$ of the scanner coordinate system in a scan position P2 with respect to the coordinate system of the object 310, a position transformation matrix $T^s_{P3}$ of the scanner coordinate system in a scan position P3 with respect to the coordinate system of the object 310.

Additionally, the first producer 231 obtains a position transformation matrix $T^{P1}_{P2}$ of the scanner coordinate system in scan position P2 with respect to the coordinate system of the scanner 120 in scan position P1, a position transformation matrix $T^{P2}_{P3}$ of the scanner coordinate system in scan position P3 with respect to the coordinate system of the scanner in scan position P2, and a position transformation matrix $T^{P1}_{P3}$ of the scanner coordinate system in scan position P3 with respect to the coordinate system of the scanner in scan position P1.

Figure 4:
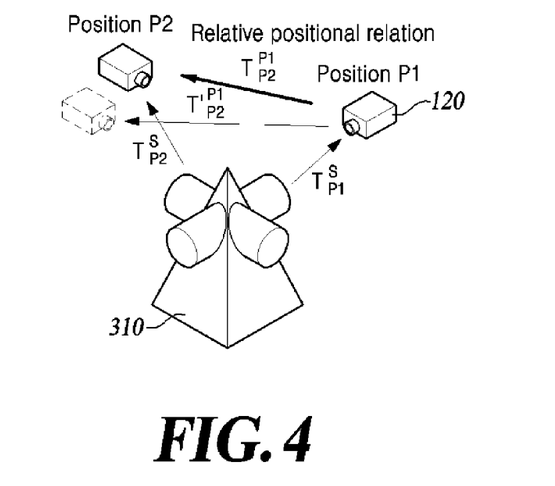
FIG. 4 is a diagram illustrating a pair of scan positions with an error that occurred between a first positional relation and a second positional relation.

FIG. 4 is a diagram illustrating a pair of scan positions with an error that occurred between a first positional relation and a second positional relation.

The second producer 232 calculates, for each of the combined scan position pairs, a positional relation between its corresponding pair of position information items (hereinafter, second positional relation). In other words, a pair of position information items is calculated for each scan position pair.

When there are three scan positions P1, P2, P3, three combined scan position pairs exist, and when there are four scan positions P1, P2, P3, P4, six combined scan position pairs exist. For example, when there are three scan positions, both the first positional relation and the second positional relation are calculated between the pair of P1 and P2, between the pair of P1 and P3, and between the pair of P2 and P3, respectively. Additionally, when there are four scan positions, both the first positional relation and the second positional relation are calculated between P1 and P2 pairs, between P1 and P3 pairs, between P1 and P4 pairs, between P2 and P3 pairs, between P2 and P4 pairs, and between P3 and P4 pairs, respectively.

The second producer 232 calculates the second positional relation by referring to P1 position information, P2 position information, and P3 position information. The P1 position information refers to such a robot coordinate system as defined by a parameter set for positioning the scanner 120 at scan position P1. The P2 position information refers to such a robot coordinate system as defined by the values of the parameter set for positioning the scanner 120 at scan position P2. The P3 position information refers to such a robot coordinate system as defined by the values of the parameter set for positioning the scanner 120 at scan position P3.

The second producer 232 calculates, as the second positional relation, a position transformation matrix $T^{P1}{}_{P2}$ of the P2 position information with respect to the P1 position information, a position transformation matrix $T^{P2}{}_{P3}$ of the P3 position information with respect to the P2 position information, and a position transformation matrix $T^{P1}{}_{P3}$ of the P3 position information with respect to the P1 position information.

The calibration value producer 233 calculates calibration values for the parameter sets based on the first positional relation and the second positional relation.

The calibration value producer 233 calculates a position error occurring between P1 and P2, a position error occurring between P2 and P3, and a position error occurring between P1 and P3.

The calibration value producer 233 calculates the difference between the position transformation matrix $T^{P1}{}_{P2}$ and the position transformation matrix $T'^{P1}{}_{P2}$ as a first position error occurring between P1 and P2, and it utilizes the calculated first position error as a basis to calculate a first calibration value range for the robot parameter.

The calibration value producer 233 calculates the difference between the position transformation matrix $T^{P2}{}_{P3}$ and the position transformation matrix $T'^{P2}{}_{P3}$ as a second position error occurring between P2 and P3, and it utilizes the calculated second position error as a basis to calculate a second calibration value range for the robot parameter.

The calibration value producer 233 calculates the difference between the position transformation matrix $T^{P1}{}_{P3}$ and the position transformation matrix $T'^{P1}{}_{P3}$ as a third position error occurring between P1 and P3, and it utilizes the calculated third position error as a basis to calculate a third calibration value range for the robot parameter.

The calibration value producer 233 calculates calibration values for the parameter sets by using the first calibration value range, the second calibration value range, and the third calibration value range.

Figure 5:
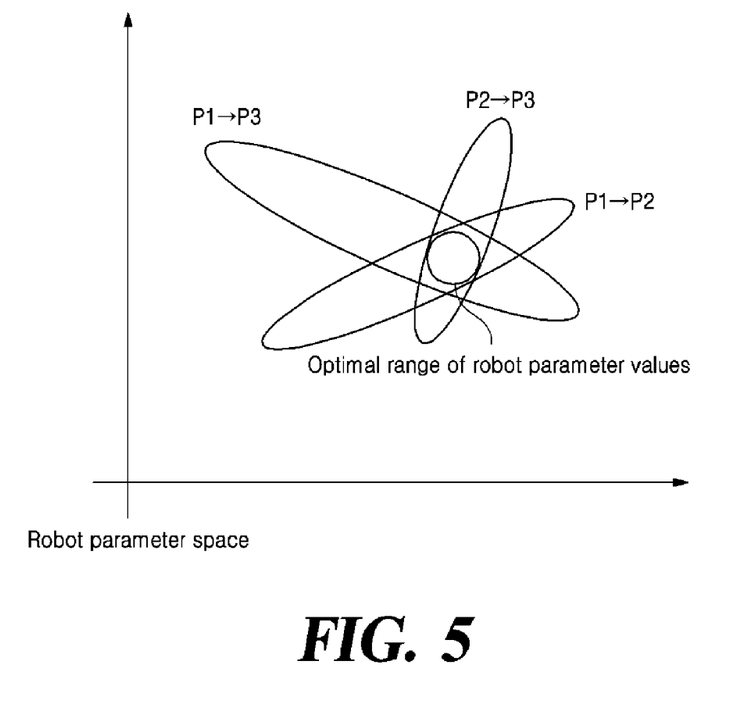
FIG. 5 is a diagram conceptually illustrating calibration value ranges for parameter sets determined in a robot parameter space.

FIG. 5 is a diagram conceptually illustrating calibration value ranges for parameter sets determined in a robot parameter space.

FIG. 5 illustrates that the robot parameter space has certain ranges occupied by the first calibration value range based on a first position error between P1 and P2, the second calibration value range based on a second position error between P2 and P3, and the third position error based on a third position error between P1 and P3, respectively.

In case a robot parameter set is defined as four parameters, such as a link length, inter-link offset, inter-link fastening angle, and joint angle, it is difficult to visualize the parameter set of the 6-axis robot because it has 24 dimensions. So, FIG. 5 is a conceptual representation of the space of the robot parameter set, illustrated on a plane.

As shown in FIG. 5, the present disclosure determines as a calibration value the value of the parameter set that is included in an overlapping region between the first calibration value range, the second calibration value range, and the third calibration value range which are each calculated for a plurality of combined scan position pairs.

The parameter calibrator 230 may calculate a calibration value for the parameter set by using computer-aided design (CAD) modeling information for the object 310.

Using the object 310 having CAD modeling information allows predicting the position of the object 310 by using the CAD model in space, thereby generating a more accurate calibration value of a parameter set. In this case, since the concept of absolute coordinates can be given to the object 310 by the CAD modeling information, it can be used as an index for estimating the accuracy of the calibration value.

The scan position controller 210 may control the position of the robot 100 for causing the scanner 120 to take multiple first scan positions to scan a second object 310a having a 2D pattern and to generate a plurality of first scan data items. In this case, the parameter calibrator 230 may utilize the multiple first scan data items and their corresponding multiple position information items to calculate a calibration value range (hereinafter, a first calibration value range) or a specific calibration value.

Meanwhile, the second object 310a having a 2D pattern may be a planar structure including a pattern of circles on a plane, a grid pattern, or various patterns that can be accurately recognized.

Using the second object 310a having a 2D pattern is advantageous in that the pattern on the second object 310a is easily arranged on a plane and the easily identifiable circular marker or a rectangle, etc allows for easy and clear perception of the origin and coordinate system of the pattern on the 3D scan data.

When calculating the parameter set calibration value by using the second object 310a having a 2D pattern, high correction accuracy may be obtained, but there are cases where it is difficult to secure high correction accuracy due to the limited range of robot positions in 2D pattern imaging.

The scan position controller 210 controls the position of the robot 100 to generate multiple first scan data items and then controls the position of the robot 100 for causing the scanner 120 to scan the second object 310a having the 2D pattern in multiple second scan positions to generate multiple second scan data items. In this case, the parameter calibrator 230 utilizes the multiple first scan data items and their corresponding multiple position information items to calculate a calibration value range for a plurality of parameter sets (hereinafter, a first calibration value range) and then utilizes the multiple second scan data items and their corresponding multiple scanner position information items to calculate calibration values for the parameter set within the first calibration value range.

Firstly determining the range of the initial parameter set correction values first by using the second object 310a having a 2D pattern including a unique shape and secondly determining the parameter set calibration values by using the second object 310 having a 3D pattern will reduce the probability of the parameter set optimization process falling into local minima and thereby minimize the calibration value error of the parameter set.

The parameter calibrator 230 calculates calibration values by setting a weight for each of a plurality of parameters in the parameter set.

According to the Denavit-Hartenberg (DH) parameter system, the relationship between the respective links of the robot 100 may be expressed in terms of four parameters including a link length, inter-link offset, inter-link fastening angle, and joint angle.

Of the four parameters, the link length, inter-link offset, and inter-link fastening angle typically have little change with time and a little error from the design values, so their calibration values are also likely to be of a very small level.

Only the offset of the joint angle among the four parameters is one associated with gear or a belt in the robot 100, and its value is susceptible to change due to wear of the gear over time and slag of the belt. Since the change in the position of the robot typically brings a non-linear characteristic to the parameter, the change in the joint angle offset value becomes a chief factor in degrading the positioning accuracy of the robot end 110.

Accordingly, a weight may be given to an error-prone parameter in a parameter set, or a parameter expected to have the greatest influence. The selective weighting is superior to equal weighting overall by better boosting the speed and accuracy of parameter set optimization.

The calibration value, robot parameter$_{update}$ of the parameter set after using the weight for the parameter is calculated by using a first equation that is [Δrobot parameter=Jacobian$^{-1}$×Δspatial error] and a second equation that is [robot parameter$_{update}$=Normalized Weight Matrix×Δrobot parameter].

In the first equation, the difference value 'Δrobot parameter' of the robot parameter set is determined according to the position difference 'Δspatial error'. In the first equation, the shape of the Jacobian$^{-1}$ matrix is determined according to the shape of the robot, and element values in the Jacobian$^{-1}$ matrix are determined according to the position of the robot 100.

Meanwhile, since the scan data used in the parameter set optimization process is obtained from the scanner 120 mounted on the robot end 110, there is a need to also find a transformation matrix at its optimal value from the robot end 110 to the optical origin of the scanner 120, which is a process included in the parameter set optimization process.

Accordingly, the parameter calibrator 230 obtains the optical origin of the scanner 120 from multiple scan data items, calculates a transformation matrix from the robot end 110 to the optical origin, and sets a plurality of scan positions.

The calibration value setter 240 sets the calibration values of the parameter sets to the robot.

The corrected robot parameter sets may be transmitted to and set as calibration values in the robot controller that controls the robot 100.

The present disclosure also envisions implementing operation software for generating the movement path of the robot to have robot parameter set calibration values transmitted to the robot 100 for every change of position of the robot 100.

The object-moving unit 250 receives a user command and controls to move the object 130 by using a moving tool mounted on the robot 100, for example, the gripper 140.

In this case, the scan position controller 210 controls the position of the robot 100 for allowing the scanner 120 to scan the object 130 at a predetermined distance from the object 130 after the movement.

Figure 6:
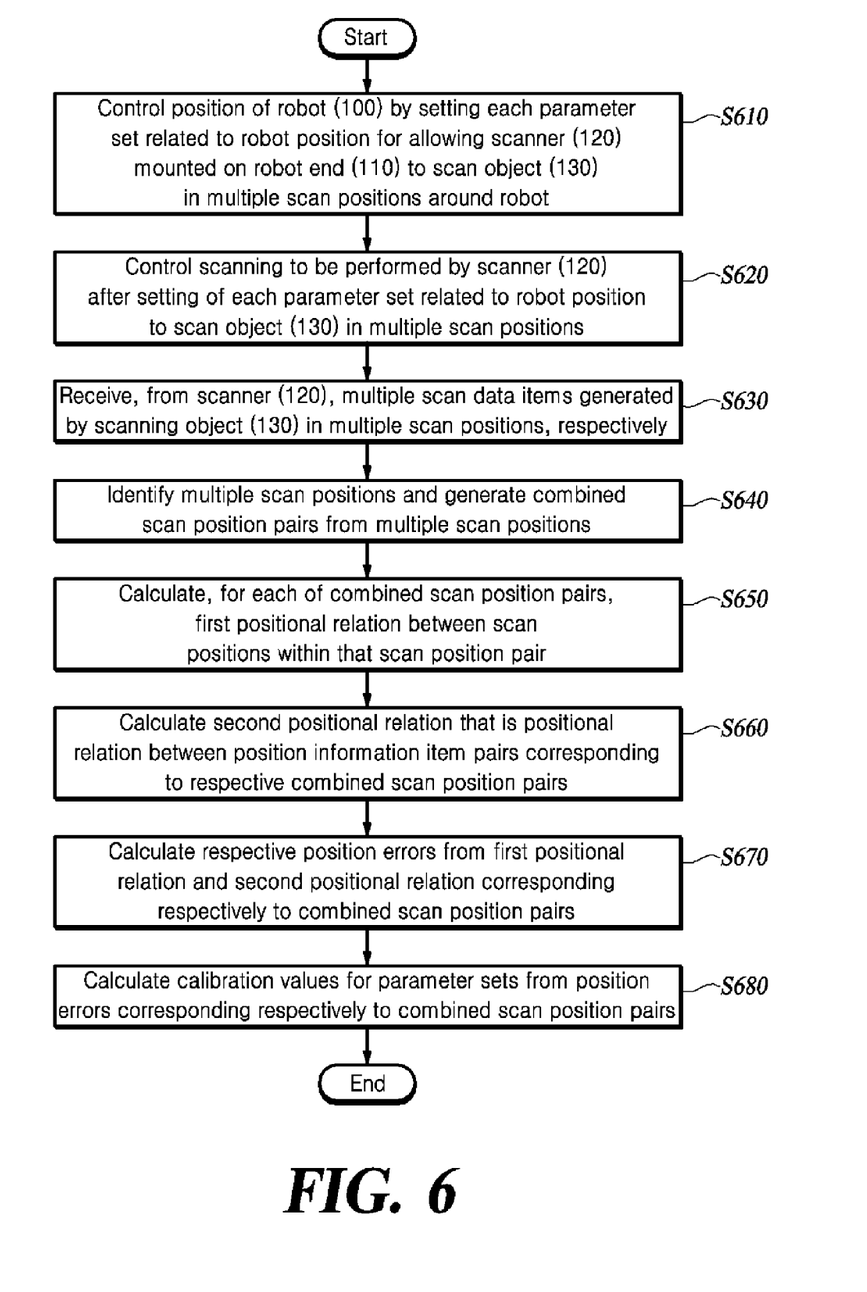
FIG. 6 is a flowchart block diagram of a robot position calibration method according to at least one embodiment.

FIG. 6 is a flowchart block diagram of a robot position calibration method according to at least one embodiment.

Hereinafter, a robot position calibration method will be described by referring to FIGS. 1 to 6 together.

The scan position controller 210 controls the position of the robot 100 by setting each parameter set related to the robot position for allowing the scanner 120 mounted on the robot end 110 to scan the object 130 in multiple scan positions around the robot (S610).

After the setting of each parameter set related to the robot position to scan the object 130 in the multiple scan positions, the scan position controller 210 controls the scanning to be performed by the scanner 120 (620).

The data receiver 220 receives, from the scanner 120, multiple scan data items generated by scanning the object 130 in the multiple scan positions, respectively (S630).

The first producer 231 identifies the multiple scan positions and generates a plurality of combined scan position pairs from the multiple scan positions (S640).

The first producer 231 calculates, for each of the combined scan position pairs, a positional relation between scan positions (hereinafter, a first positional relation) within that scan position pair (S650).

The second producer 232 calculates a positional relation between position information item pairs (hereinafter, a second positional relation) corresponding to the respective combined scan position pairs (S660).

The calibration value producer 233 calculates respective position errors from the first positional relation and the second positional relation corresponding respectively to the combined scan position pairs (S670).

The calibration value producer 233 calculates calibration values for the parameter sets from the position errors corresponding respectively to the combined scan position pairs (S680).

Although the steps in the respective flowcharts are described to be sequentially performed, they merely instantiate the technical idea of some embodiments of the present disclosure. Therefore, a person having ordinary skill in the pertinent art could perform the steps by changing the sequences described in the respective drawings or by performing two or more of the steps in parallel, and hence the steps in the respective flowcharts are not limited to the illustrated chronological sequences.

Various implementations of the systems and methods described herein may be realized by digital electronic circuitry, integrated circuits, field-programmable gate arrays (FPGAs), application-specific integrated circuits (ASICs), computer hardware, firmware, software, and/or their combination. These various implementations can include those realized in one or more computer programs executable on a programmable system. The programmable system includes at least one programmable processor coupled to receive and transmit data and instructions from and to a storage system, at least one input device, and at least one output device, wherein the programmable processor may be a special-purpose processor or a general-purpose processor. Computer programs, which are also known as programs, software, software applications, or codes, contain instructions for a programmable processor and are stored in a "computer-readable recording medium."

The computer-readable recording medium includes any types of recording device on which data that can be read by a computer system are recordable. Examples of computer-readable recording medium include non-volatile or nontransitory media such as a ROM, CD-ROM, magnetic tape, floppy disk, memory card, hard disk, optical/magnetic disk, storage devices, and the like. The computer-readable recording medium further includes transitory media such as carrier waves (e.g., transmission through the Internet) and data transmission medium. Further, the computer-readable recording medium can be distributed in computer systems connected via a network, wherein the computer-readable codes can be stored and executed in a distributed mode.

Various implementations of the systems and techniques described herein can be realized by a programmable computer. Here, the computer includes a programmable processor, a data storage system (including volatile memory, nonvolatile memory, or any other type of storage system or a combination thereof), and at least one communication interface. For example, the programmable computer may be one of a server, network equipment, a set-top box, an embedded device, a computer expansion module, a personal computer, a laptop, a personal data assistant (PDA), a cloud computing system, and a mobile device.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

| REFERENCE NUMERALS | |
|---|---|
| 100: robot | 110: end |
| 120: scanner | 130: object |
| 140: gripper | |
| 200: robot position calibration apparatus | 210: scan position controller |
| 220: data receiver | 230: parameter calibrator |
| 231: first producer | 232: second producer |
| 233: calibration value producer | 240: calibration value setter |
| 250: object-moving unit | 310: object |
| 310a: 2D object | |

The invention claimed is:

1. An apparatus for calibrating a position of a robot, comprising:
   a scan position controller configured to control the position of the robot by individually setting parameter sets related to the position of the robot for causing a scanner mounted on an end of the robot to scan an object in multiple scan positions around the robot;
   a data receiver configured to receive, from the scanner, multiple scan data items generated by the scanner scanning the object in each of the multiple scan positions; and
   a parameter calibrator configured to calculate calibration values for the parameter sets having been individually set, by using multiple position information items corresponding to the parameter sets and the multiple scan data items;
   wherein the scan position controller is configured to control the position of the robot for allowing the scanner to scan a second, two-dimensional patterned object in multiple first scan positions to generate first scan data and then to control the position of the robot for allowing the scanner to scan a second, three-dimensional shaped object in multiple second scan positions to generate second scan data.

2. The apparatus of claim 1, wherein the parameter calibrator is configured to calculate the calibration values by using relative position differences between the multiple scan positions and relative position differences between the multiple position information items.

3. The apparatus of claim 1, wherein the parameter calibrator comprises:
   a first producer configured to calculate a first positional relation that comprises positional relations between the multiple scan locations by using the multiple scan data items;
   a second producer configured to calculate a second positional relation that comprises positional relations between the multiple position information items; and
   a calibration value producer configured to calculate calibration values for the parameter sets based on the first positional relation and the second positional relation.

4. The apparatus of claim 3, wherein the first positional relation and the second positional relation are respectively calculated for each of combined pairs of scan positions.

5. The apparatus of claim 1, wherein the parameter calibrator is configured to calculate the calibration values for the parameter sets by using CAD modeling information for the object.

6. The apparatus of claim 1, wherein the parameter calibrator is configured to calculate a first calibration value range that is a calibration value range for the parameter sets by using the first scan data and multiple position information items corresponding to the first scan data, and then to calculate the calibration values for the parameter sets within the first calibration value range by using the second scan data and multiple position information items corresponding to the second scan data.

7. The apparatus of claim 1, wherein the parameter calibrator is configured to calculate the calibration values by setting a weight for each of a plurality of parameters in the parameter sets.

8. The apparatus of claim 1, wherein the parameter calibrator is configured to obtain an optical origin of the scanner from the multiple scan data items, and to perceive the scan positions by calculating a transformation matrix from the end to the optical origin.

9. The apparatus of claim 1, wherein the parameter calibrator further comprises:
   an object-moving unit configured to cause a controlled movement of the object by using a moving tool mounted on the robot according to a user command, and
   wherein the scan position controller is configured to control the position of the robot for causing the scanner to scan the object at a predetermined distance from the object having been moved.

10. A method of calibrating a position of a robot, the method comprising:
   controlling the position of the robot by individually setting parameter sets related to the position of the robot for causing a scanner mounted on an end of the robot to scan an object in multiple scan positions around the robot;
   receiving, from the scanner, multiple scan data items generated by the scanner scanning the object in each of the multiple scan positions; and calculating calibration values for the parameter sets having been individually set, by using multiple position information items corresponding to the parameter sets and the multiple scan data items;

wherein, controlling the position of the robot comprises:

controlling the position of the robot for allowing the scanner to scan a second, two-dimensional patterned object in multiple first scan positions to generate first scan data; and controlling the position of the robot for allowing the scanner to scan a second, three-dimensional shaped object in multiple second scan positions to generate second scan data.

\* \* \* \* \*